United States Patent [19]

Kelton

[11] 3,834,354
[45] Sept. 10, 1974

[54] IMITATION HORNS FOR STEERS
[76] Inventor: Robert Lee Kelton, 1895 Hayden Ln., Tempe, Ariz. 85281
[22] Filed: Sept. 20, 1973
[21] Appl. No.: 398,945

[52] U.S. Cl. .......................................... 119/144
[51] Int. Cl. .................................. A 01 K 17/00
[58] Field of Search .................... 119/144; 128/76 D

[56] References Cited
UNITED STATES PATENTS
3,052,216  9/1962  Blunt et al. ..................... 119/144
3,766,889  10/1973  Mills .............................. 119/144

Primary Examiner—Hugh R. Chamblee
Attorney, Agent, or Firm—Warren F. B. Lindsley

[57] ABSTRACT

Apparatus comprising imitation hollow horns appropriately formed for slipping over the natural trimmed horns of a steer and attached to its head for rendering a steer with short horns usable for roping purposes and for protecting the steer's head from the rubbing effects of the rope.

6 Claims, 4 Drawing Figures

PATENTED SEP 10 1974

3,834,354

3,834,354

IMITATION HORNS FOR STEERS

BACKGROUND OF THE INVENTION

This invention is directed to an apparatus for rendering a short horn steer usable for roping purposes and to the need for protecting the head of a steer from rope caused abrasion at the base of the horns during roping practice.

DESCRIPTION OF THE PRIOR ART

Cattle roping or lassoing is a well known art which has been practiced for years in handling cattle on a working ranch and for the purpose of entertainment. In both cases, a continuing supply of individuals skilled in the use of a lariat or lasso is needed for roping moving animals from horseback. Further, the horses used for this purpose need to be trained to follow the moving animal at a proper speed and distance to allow the cowboy to perform his roping task. Such training involves many hours of practice and requires the repeated roping of cattle or steers provided for this purpose.

In one popular form of the roping art, the lariat or lasso is thrown over the horns of the steer. As the lasso is jerked or pulled taut, the loop tightens securely around the base of the steer's horns causing in the process a certain amount of abrasion action on the head of the animal which may become abusive if the roping procedure is repeated again and again on the same animal during practice routines. For this reason, several animals must be made available for such use.

In a copending patent application, Ser. No. 319,485, of this inventor, an animated mechanical steer is described which obviates the need for a live steer in the early training stages, but as the skills of the cowboy and of his horse progress, a live steer is needed for producing the desired evasive running patterns of the livestock.

Thus, a need is seen to exist not only for rendering short horn steers usable for roping purposes since the supply of long horn steers is in short supply, but also to protect the head and horns of the steer during roping practice so that repeated use of the same steer may occur without the hazard of injury or abuse to the steer.

SUMMARY OF THE INVENTION

It is, therefore, one object of this invention to provide a protective apparatus that may be secured to the head and horns of a short horn steer for roping functions.

Another object of this invention is to provide a protective apparatus that will protect the steer's heads from rope abrasion.

A further object of this invention is to provide head gear for steers which is securely fastened in place on the head of the steer and remains there during vigorous roping activity.

A still further object of this invention is to provide such an apparatus which will render otherwise marginally training animals having short horns suitable for roping purposes.

A still further object of this invention is to provide an apparatus employing imitation horns for steers that when mounted on the head of the animal makes the animal realistic in appearance and the horns resembling closely a steer with fully developed horns.

Further objects and advantages of this invention will become apparent as the following description proceeds and the features of novelty which characterize the invention will be pointed out with particularity in the claims annexed to and forming a part of this specification.

BRIEF DESCRIPTION OF THE DRAWING

The present invention may be more readily described by reference to the accompanying drawings, in which.

DESCRIPTION OF THE PREFERRED EMBODIMENT

Figures 1, 4:
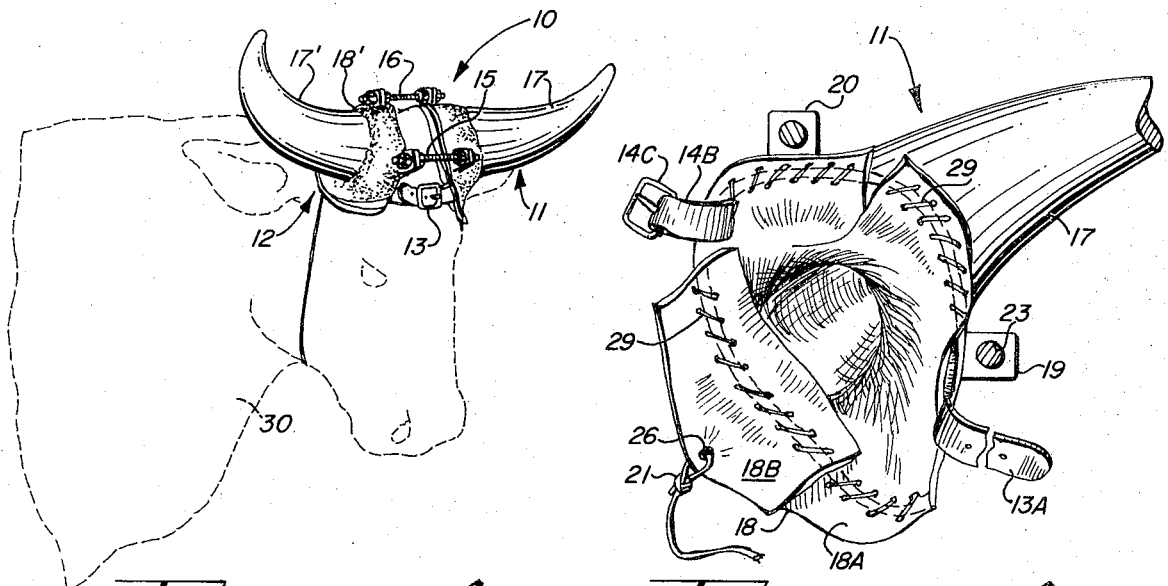
FIG. 1 is a perspective view of a horn covering apparatus secured to the head of a steer and embodying the invention.
FIG. 4 is a view of a portion of the apparatus taken on line 4—4 of FIG. 3 and showing the hollow inner portion of one of the imitation horns.
Figure 2:
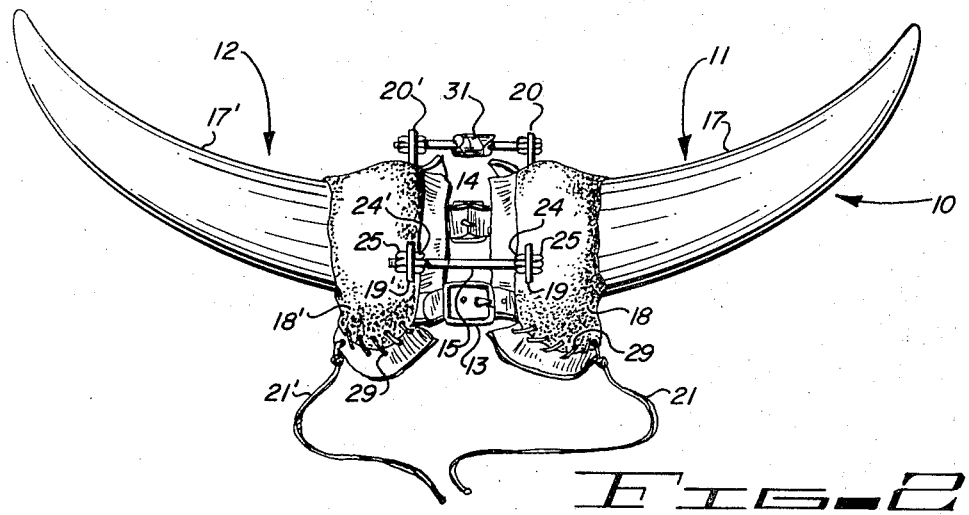
FIG. 2 is a front view of the horn covering apparatus shown in FIG. 1.
Figure 3:
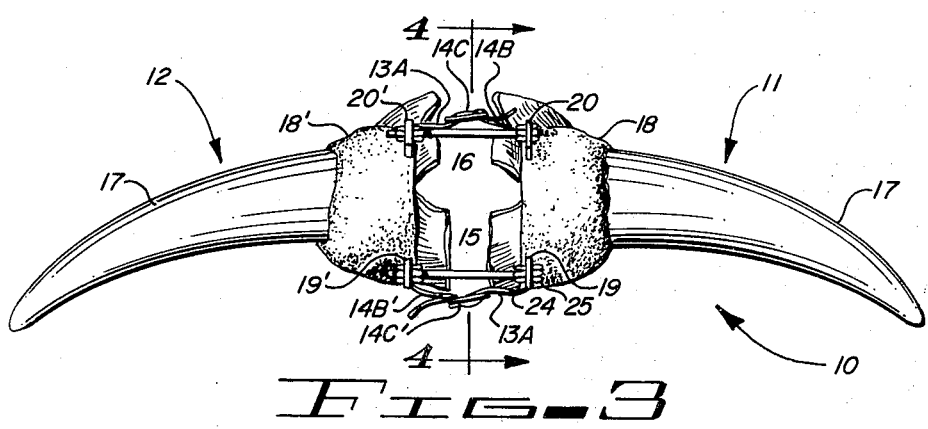
FIG. 3 is a top view of the horn covering apparatus shown in FIGS. 1 and 2.

Referring more particularly to the drawing by characters of reference, FIGS. 1–4 disclose a horn covering apparatus 10 for steers comprising a left horn assembly 11 and a right horn assembly 12 secured together as shown in FIGS. 1–3 by means of front and rear strap and buckle combinations 13 and 14, respectively, employing front and rear threaded studs 15 and 16.

Horn assemblies 11 and 12, as depicted most clearly in the case of horn assembly 11 in FIG. 4, comprise hollow molded horn 17, 17', leather shielding 18, 18', two metal brackets 19, 20 and 19', 20' embedded in horn 17, 17', first pierced leather strap 13, 13' and second leather strap 14B, 14B' securing buckles 14C and 14C'. Straps 13A, 13B, 14A' and 14B are riveted to front and rear portions, respectively, of the shields 18 and 18'. Cords 21 and 21' are secured to the lower center edge of shields 18, 18' by insertion through pierced holes 26, 26' in shield 18 and tied as shown.

Molded horns 17, 17' have the form of hollow horns closely resembling the natural horn of a steer and having an inner contour and dimension appropriate for fitting over a live steer's short or trimmed horn.

The cavities 22 inside horns 17, 17' have contours and dimsneions appropriate to allow them to be slipped over the ends of the horns of a live steer with suitable clearance.

The material from which horns 17, 17' are molded may be fiberglass or one of a number of suitable plastic materials strengthened by cloth, fiber or other materials bonded together during the molding process.

The metal brackets 19, 20 and 19', 20' molded into horn 17, 17' serve as reinforcing members internally of horns 17, 17' and their external portions protruding at right angles from the surface of the apparatus near the base of the horns serve in cooperation with threaded studs 15 and 16 as a means for securely clamping the two horn assemblies 11 and 12 in place on the horns of steer 30 shown in FIG. 1. Stud 15, for example, passes through hole 23 of bracket 19 where it is secured by two nuts 24 and 25 threaded over its end one on each side of bracket 19. The other end of stud 15 passes through the hole of a corresponding metal bracket 19' of horn assembly 12, where it is similarly secured by two additional nuts 24' and 25'. Once horn assemblies 11 and 12 are in place over the horns of steer 30, they are secured more tightly by working nuts 24, 25, 24' and 25' toward the center of stud 15. Stud 16 and suitable nuts at its ends cooperate in the same manner with brackets 20 and 20' on horn assembly 12.

Leather strap 13A mates with a corresponding strap 14B' and buckle 14C' identical to 14B and 14C located directly opposite strap 13A on horn assembly 12. Strap 14B and buckle 14C similarly mate with a pierced strap 13A' appropriately positioned on horn assembly 12.

The locations of studs 15 and 16 to the front and rear, respectively, of the steer's horns and the locations of the strap and buckle combinations 13 and 14 ahead of stud 15 and to the rear of stud 16, respectively, contribute to the stablity of the mounted apparatus 10.

In order to protect the steer from rope abrasion, leather shields 18, 18' are stitched to the base of horns 17, 17' by a heavy, tough cord 29. As shown more clearly in FIG. 4, shields 18, 18' are made from two pieces, 18A, 18B and 18A', 18B' for convenience in fabrication although they may be formed from one piece. Shields 18, 18' conform to the inner contours of horns 17, 17' and may protrude inwardly thereof a predetermined distance and then outwardly from the base of horns 17, 17' to cover a given area of the steer's head at the base of his horns. Shields 18, 18' serve to cushion the head and horns of the steer to reduce the stress and pressure experienced by the steer while the apparatus is secured in place and to prevent abrasion of the steer's hide if apparatus 10 shifts position in use. The portions of shields 18, 18' which protrude from the base of horns 17, 17' over the head of the animal also protect the animal against the abrasive action of the lariat or lasso which now bears against the outer protruding surface of shields 18, 18' rather than directly against the hide of the animal.

The additional length of horns 17, 17' as compared with the short length of the steer's natural horn is an aid in the roping operation.

The procedure for mounting the apparatus on the steer's head and horns is as follows: Horn assemblies 11 and 12 with studs 15 and 16 removed or detached at least at one end and with strap and buckle combinations 13 and 14 undone, are slipped over the horns of a steer. The straps and buckles are then secured, cords 21 and 27 tied together under the jaws of the steer, and the threaded studs 15 and 16 secured in place and tightened. If desired, studs 15 and 16 may be covered with tape or a leather pad 31 to prevent the lariat from catching on its ends or rough surfaces.

Because of the protection afforded the animal by virtue of the special design of apparatus 10, a single training steer wearing the apparatus may be roped repeatedly in the training routine without injury or discomfort to the animal and a training facility will not have to keep as large a number of steers on hand for this purpose.

Although but one embodiment of this invention has been illustrated and described, it will be apparent to those skilled in the art that various changes and modifications may be made therein without departing from the spirit of the invention or from the scope of the appended claims.

I claim:

1. Apparatus for providing imitation horns for steers for roping purposes comprising:
    a pair of hollow imitation steer horns having an opening in one end of each of said horns for detachably receiving the stub end of a natural steer horn,
    a shield mounted around the periphery of the opening of each of said horns and flaring outwardly therefrom, and
    means connected to each of said horns for detachably interconnecting said horns after they have been placed on stub ends of the horns of a steer,
    said shield on each of said horns protecting the steer from rope abrasion during roping of the steer around its imitation horns.

2. The apparatus set forth in claim 1 wherein:
    said hollow imitation steer horns are formed of molded plastic.

3. The apparatus set forth in claim 2 wherein:
    said means connected to each of said horns for detachably interconnecting said horns comprises a pair of apertured brackets one molded in each of said horns, a bolt having a different end extending through, a different one of said apertures and
    means for detachably securing said bolts in said apertures at various positions.

4. The apparatus set forth in claim 3 wherein:
    said bolt is threaded along its length, and
    said means for detachably securing said bolts in said apertures comprises at least a pair of nuts for one end of said bolts positioned one on each side of the bracket.

5. The apparatus set forth in claim 2 wherein:
    said means connected to each of said horns comprises two pairs of apertured brackets one pair spacedly molded in each of said horns, a pair of bolts each having a different end extending through a different one of said apertures, and means for detachably securing said bolts in said apertures at various positions.

6. The apparatus set forth in claim 2 wherein:
    said shield is formed of leather.

* * * * *